United States Patent
Nitta

[15] 3,671,688
[45] June 20, 1972

[54] POWER CIRCUIT BREAKER

[72] Inventor: Yoshio Nitta, Kawasaki, Japan

[73] Assignee: Fuji Denki Seizo Kabushiki Kaisha, Kanagawa-ken, Japan

[22] Filed: Dec. 22, 1970

[21] Appl. No.: 100,719

[52] U.S. Cl.................200/48 R, 200/148 R, 317/58, 307/138
[51] Int. Cl......................................H01h 33/82
[58] Field of Search............200/148, 48; 317/360, 58 X, 317/59, 60; 307/138, 139, 140, 92, 93, 94

[56] References Cited

UNITED STATES PATENTS

| | | | |
|---|---|---|---|
| 3,315,056 | 4/1967 | Furukawa et al. | 200/148 R |
| 3,315,147 | 4/1967 | Cook et al. | 317/58 X |

Primary Examiner—Herman J. Hohauser
Attorney—Holman & Stern

[57] ABSTRACT

An improved power circuit breaker comprising a pair of electrodes which are to be broken in the case of accidental trouble; a condenser; an electromagnetic coil coupled electromagnetically with an electrode of said pair electrodes, opening of said electrodes being attained by discharging charged energy of said condenser into said electromagnetic coil; and an electromagnetic wave generating device provided at a high potential part; in which said electromagnetic wave is passed through interior of a support insulator, and electric energy necessary for operating said electromagnetic wave generating device is supplied from a power source for charging said condenser, whereby an electromagnetic wave corresponding to line current is produced at a high potential part and said wave is converted to an electric signal by means of a receiver provided at an earth potential part, thus introducing said signal to various control devices.

1 Claim, 1 Drawing Figure

PATENTED JUN 20 1972 3,671,688
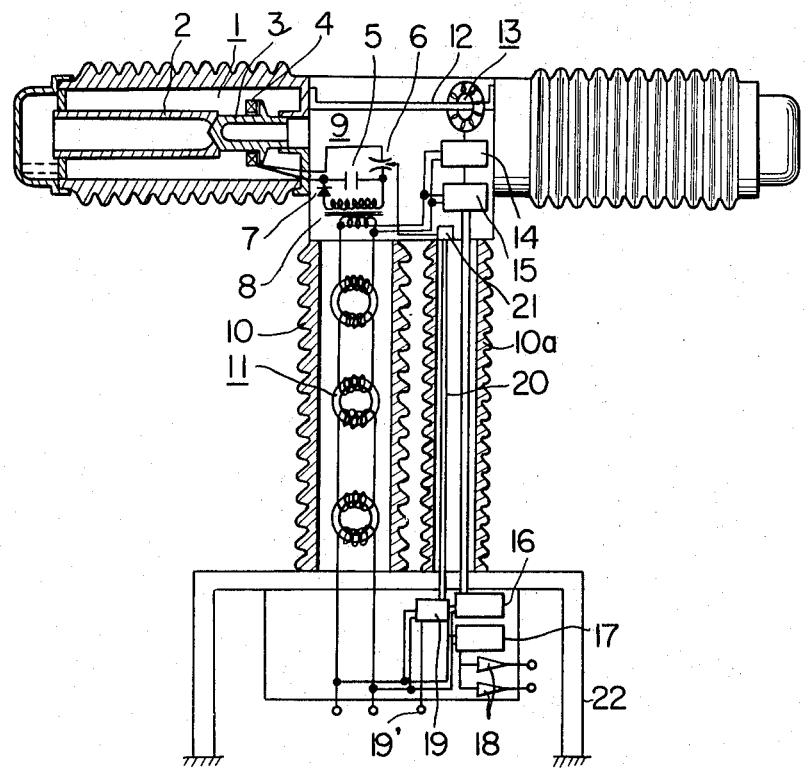
INVENTOR
Yoshio Nitta
BY Holman & Stern
ATTORNEYS 3,671,688

POWER CIRCUIT BREAKER

BACKGROUND OF THE INVENTION

In conventional power circuit breakers, for the purpose of imparting any actuating signals to tripping operation of the circuit breaker and to various control devices, it is indispensable to provide an independent current transformer besides the circuit breaker in the same bus lines. In the case of high voltage system, however, a support insulator adapted to support the current transformer mentioned above becomes large, and percentage cost of said current transformer with respect to total cost of the circuit breaker apparatus will become relatively large, particularly in the case of super high voltage system.

On the other hand, in the high voltage power systems, as a particularly effective, illustrative power circuit breaker, a circuit breaker, in which an electric energy stored in condenser means is made to discharge into an electromagnetic coil coupled electromagnetically with one of electrodes of a pair, whereby the movable electrode of said pair is made to be impulsively opened from the other confronting electrode by means of induction current produced in said movable electrode and current flowing through said electromagnetic coil, has been already proposed (refer to U.S. Pat. No. 3,315,056).

In the circuit breaker mentioned above, supply of charging energy to the condenser means provided on a high potential side is carried out through insulating transformers which are combined as multistage type and enclosed in a support insulator of the circuit breaker. The present invention relates to improvement of the circuit breaker mentioned above.

SUMMARY OF THE INVENTION

Therefore, an essential object of the present invention is to provide an improved power circuit breaker for high voltage, which does not necessitate any independent current transformer and can produce effectively an electromagnetic wave capable of being converted into an electric signal adapted to operate various control devices.

The said object and other objects and characteric features and functions of the invention will become apparent from the following description taken in conjunction with the appended drawing:

BRIEF DESCRIPTION OF THE DRAWING

The FIGURE is an elevational view, vertically sectioned in part, of an example of the invention.

DETAILED DESCRIPTION OF THE INVENTION

Referring to the drawing, the circuit breaker comprises a circuit breaking part 1 consisting of a pair of relatively openable contact electrodes 2 and 3, an electromagnetic coil 4 coupled to said electrode 3 in electromagnetically close relation thereto, and a condenser 5 connected in series to said coil 4 so as to be able to discharge electric energy stored in said condenser into said coil 4, thereby to forcibly open said electrode 2 from said electrode 3. Referring to detailed structure of the above-mentioned construction, refer to U.S. Pat. No. 3,315,056. An electric power source device 9 consists of a discharge gap 6, a rectifier 7, a transformer 8, and said condenser 5, and electric energy of said power source device 9 is supplied from the earth potential part through a transformer 11 of multistage type which is enclosed in a support insulator 10.

The left and right circuit breaking parts 1 are connected to each other by means of a conductor 12 which in turn is provided with a current transformer 13 having a ring-shaped iron core, and output of secondary coil of said transformer 13 is connected to input side of an electronic modulator 14 output side of which is connected to input side of an electronic transmitter 15. Electric energy necessary for operation of the modulator 14 and transmitter 15 is supplied from the last stage of the transformer 11, whereby output of the modulator 14 is introduced into the transmitter 15, thereby to produce a predetermined electromagnetic wave, particularly a light wave, thus radiating said light wave toward the earth through a support insulator 10a.

On the earth side, there is provided an apparatus for receiving the electromagnetic wave transmitted from the transmitter 15 and converting said received wave into an electric signal, said apparatus comprising a receiver 16, a demodulator 17 and several amplifiers 18. Furthermore, the circuit breaker comprises a trip device 19 having an outer terminal 19' and a light conductor 20 provided in the support insulator 10a, input and output sides of said light conductor 20 being connected respectively to output terminal of the receiver 16 and to input terminal of a receiver 21 provided at a high potential part. The member 19, 20, 16, and 21 are assembled so that when an instruction is imparted to the terminal 19', the trip device 19 operates and a light wave is transmitted from the receiver 16 to the receiver 21 through the light conductor 20, whereby the light wave is converted into an electric signal by said receiver 21, thereby to excite the discharge gap 6, thus causing circuit breaking operation. In the drawing, support base frame is represented by numeral 22.

According to the construction as mentioned above, the electric energy of the modulator 14 and transmitter 15 provided respectively at a high potential part is supplied from the transformer 11 which is provided in order to previously charge the condenser 5, so that it is not necessaty to lead the electric power source adapted for said modulator 14 and transmitter 15 to a high potential part, and pulsive light wave is always transmitted toward earth when the secondary current of the current transformer 13 is steady. On the other hand, at the earth side, the receiver 16, demodulator 17 and other devices are adjusted so that they are not operated by the light wave transmitted in the steady state of the secondary current of the current transformer 13.

Furthermore, in the circuit breaker mentioned above, if a breaking instruction is imparted to the outer terminal 19', the circuit breaking part 1 is opened by discharge of the condenser 5, as described already. In this case, it should be noted that since a circuit breaking instruction is imparted at the instant when an accidental current flows through the bus lines, frequency of the light wave produced from the transmitter 15 can be increased while maintaining amplitude of said wave at a constant value, and said light wave is received, demodulated, and detected thereby to increase output value of the amplifier 18, thus causing possibility of a predetermined operation of the other measuring control equipment.

As described above, according to the present invention, since a device capable of producing an electromagnetic wave, particularly a light wave corresponding to the magnitude of the bus line current is provided at a high potential part and an electric energy necessary for said device is obtained from an electric power source led at a high potential part, the signal transmitting procedure as mentioned in connection with the drawing has become possible. Furthermore, the electromagnetic wave is passed through the interior of the support insulator, so that a particular insulating tube necessary for transmitting the signal has become unnecessary, thus causing economical structure of a high-tension circuit breaker.

As a whole, according to the circuit breaker of this invention, the internal elements of a high-tension circuit breaker is replaced, without employing an independent current transformer, by a device having the same ability as those of said elements and enclosed in the support insulator, so that the circuit breaker becomes most reasonable in view of principle, function and cost.

What is claimed is:

1. In a power circuit breaker, in which a movable electrode is forcibly opened from another confronting electrode by discharging an electric energy stored in a condenser, said electrodes forming the main circuit breaking part; an improvement according to which said circuit breaker additionally comprises an electromagnetic wave generating means which is provided in a high potential part; a passage provided in a support insulator for supporting the circuit breaker and adapted to pass said generated wave therethrough, said wave generating means being connected to a power source for charging said condenser and producing an electromagnetic wave corresponding to the magnitude of the bus line current to be broken; and a signal transmitting device comprising a receiver means provided at an earth potential side for receiving said generated wave, said receiver means converting said electromagnetic wave into an electric signal.

* * * * *